United States Patent [19]

Eickmann

[11] Patent Number: 4,688,743

[45] Date of Patent: * Aug. 25, 1987

[54] AIRCRAFT WITH A RETRACTABLE VARIABLE PITCH PROPELLER OR A FLUID MOTOR DRIVEN MULTI PROPELLER AIRCRAFT

[76] Inventor: Karl Eickmann, 2420 Isshiki, Hayama-machi, Kanagawa-ken, Japan

[*] Notice: The portion of the term of this patent subsequent to Mar. 12, 2002 has been disclaimed.

[21] Appl. No.: 709,872

[22] Filed: Mar. 8, 1985

Related U.S. Application Data

[63] Continuation-in-part of Ser. No. 533,073, Sep. 16, 1983, Pat. No. 4,504,029.

[51] Int. Cl.⁴ .............................................. B64C 11/28
[52] U.S. Cl. ...................................... 244/54; 244/7 R; 244/56
[58] Field of Search ............... 244/53 R, 54, 55, 7 R, 244/7 C, 17.11, 56, 66, 60, 123, 48, 65

[56] References Cited

U.S. PATENT DOCUMENTS

| | | | |
|---|---|---|---|
| 2,514,639 | 7/1950 | Haack | 244/56 |
| 2,514,822 | 7/1950 | Wolfe | 244/60 |
| 2,926,869 | 3/1960 | Sullivan | 244/56 |

FOREIGN PATENT DOCUMENTS

| | | | |
|---|---|---|---|
| 3240995 | 5/1984 | Fed. Rep. of Germany | 244/16 |
| 966032 | 9/1950 | France | 244/7 R |
| 609153 | 9/1948 | United Kingdom | 244/7 R |
| 1322169 | 7/1973 | United Kingdom | 244/7 R |

Primary Examiner—Galen Barefoot

[57] ABSTRACT

An aircraft has a pair of wing portions with propellers of a propeller pair which are driven and synchronized by a fluid transmission between the power plant and the propellers. A fluid line structure keeps most components of the craft together and consists preferredly of three pipes which are also utilized to carry the driving fluid to and from the motors, to hold the motors and to hold the wings. The take over of a plurality of functions by the interior pipe structure reduces weight and secures safe and economic operation of the craft. In the type of the aircraft where this application deals with, a variable pitch propeller may be applied which operates with variable pitch at flight to obtain its best efficiency at the respective speed of flight while the propeller is set with its chord parallel to the chord of the wing or tail when it is retracted into a slot in the wing or tail when another propeller drives the craft forward in leveled flight. This arrangement makes it suitable to apply a plurality of propellers for short way or vertical take off and landing while those propellers which are not needed or would reduce the efficiency at forward flight can be retracted to reduce drag at high speed forward flight.

1 Claim, 6 Drawing Figures

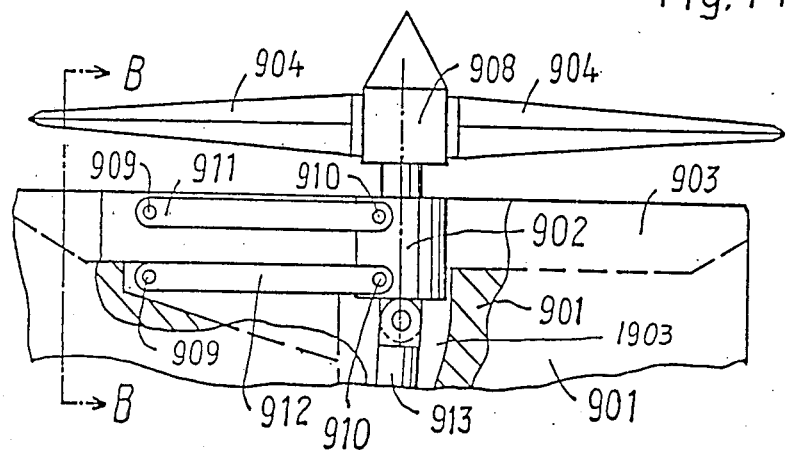
Fig. 1-A
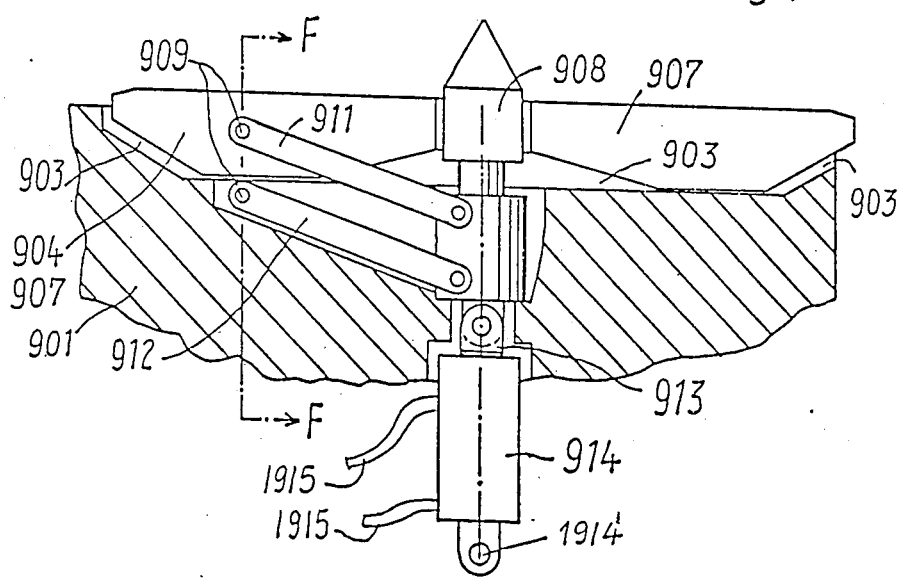
Fig. 1-D
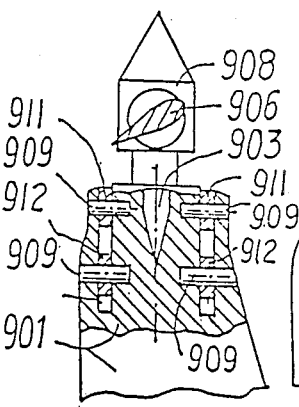
Fig. 1-F
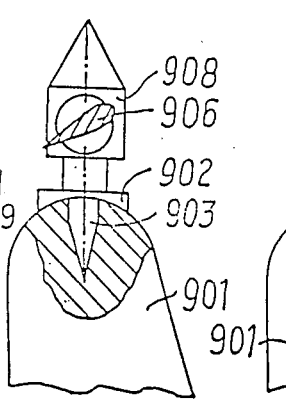
Fig. 1-B
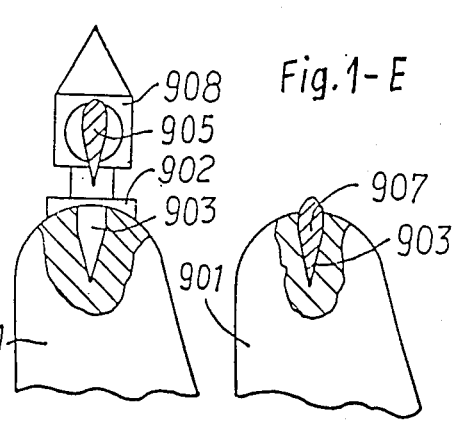
Fig. 1-C
Fig. 1-E

AIRCRAFT WITH A RETRACTABLE VARIABLE PITCH PROPELLER OR A FLUID MOTOR DRIVEN MULTI PROPELLER AIRCRAFT

REFERENCE TO RELATED APPLICATIONS

This is a continuation in part application of my application Ser. No. 533,073 which was filed on Sept. 16, 1983 and issued as U.S. Pat. No. 4,504,029 on Mar. 12, 1985. The mentioned application 533,073 has a number of benefits of earlier applications which are cited on page 1 of U.S. Pat. No. 4,504,029 and the benefits of these mentioned applications are partially claimed also for this present application.

BACKGROUND OF THE INVENTION

1. Field of the Invention

This invention relates to retractable propellers, for example to such which are shown in my U.S. Pat. No. 4,136,145 but at the same time to propellers which can vary their pitch.

2. Description of the Prior Art

In my U.S. Pat. No. 4,136,145 a two bladed propeller is shown which can swing its blades forward and can then be retracted into the wing or body of a fluid borne craft. From the motor glieders it is known, that the pitches of two bladed propellers can be set into a "zero" position at which their chords are substantially equally directed to the flight path of the aircraft.

SUMMARY OF THE INVENTION

The invention has as its aim and object to increase the efficiency of aircraft still further.

In order to obtain this aim of the invention, the main object of this invention is to provide a recess in the front portion of a wing of an aircraft and to retract the two bladed propeller into the recess at time when the propeller is not needed in flight or at times when the propeller would provide a resistance at flight or movement in the air or fluid. In this respect it is desired also by this invention to retract a portion of the provided propellers, when other ropellers still work. For example, a pair of propellers of my U.S. Pat. No. 4,387,866 may become retracted into the respective wing(s) at times when the other pair of the propellers still pull the craft forward in substantially horizontal flight.

BRIEF DESCRIPTION OF THE DRAWING(S)

FIGS. 1-A to 1-F show sectional views through portions of an aircraft of the invention, with:

FIG. 1-A showing the propeller extended.

FIG. 1-D showing the propeller retracted into a wing portion, while FIG. 1-B,1-C and 1-F show sectional views through FIG. 1-A with different pitches of the propeller blade, and:

FIG. 1-E shows the propeller retracted into the recess in a wing in a cross section view.

DESCRIPTION OF THE PREFERRED EMBODIMENT

In my patent parental application Ser. No. 533,073, now U.S. Pat. No. 4,504,029; the basic portion of my invention is described and shown in its FIG. 19. The details thereof were, however, still rather rough and provided unnecessary resistances by slots and retraction means.

These drawbacks of my parental application have not prevented the parental invention from working, but it has now been found by the present invention, that several details can still be further improved. The propeller will then fit better in the recess when it is retracted into it, the retraction means will have better guide means and the resistance of the propeller when retracted into its recess in the wing (or body) will be reduced when the craft flies through the air. The overall efficiency of the aircraft will thereby be further increased.

In the mentioned parental patent the propeller is described to be retractable into a recess or slot in the front portion of a wing or of a tail wing of a craft. Since wings or rear wings of aircraft extend laterally to the right and left of the body or the craft, the retractable propellers are arranged in pairs. One propeller in the right wing portion and the other of the propeller pair in the left wing portion. The aircraft may, for example, be a motor glider or, as shown in the mentioned parental patent, a vertical take off craft with four or more propellers. It can also be craft of my patents or other craft with four or more propellers on the wing portions of the same wing portion's pair. For take off the many propellers provide an effective thrust and shorten the length of the take off way. But at high speed forward flight the many propellers are a burden because they provide undesired resistances. It becomes therefore more and more important to retract a propeller or propeller pairs of a number of propeller pairs into the respective wing in order to obtain a highl effective high speed forward flight. The present invention improves by its embodiments the details of retractable propeller arrangements in order to make them safe in operation and in order to reduce their resistances at flight. The preferred embodiment shows sectional views through a single retractable propeller arrangement. Actually the aircraft provides commonly at least two of such arrangements on an aircraft, each one on one wing portion.

In the embodiment of FIG. 1 a retractable propeller 904 is shown, which may be a propeller with highly adjustable pitch, for example a propeller of a motor-glider-system with a sailing pitch position. At such extreme position the propeller pitch is set to be parallel to the direction of flight. This propeller pitch position is shon in part 6 of the Figure in the cross-sectional view along B—B of part A of the Figure. Part B of the Figure shows a propeller-pitch of usual flight position, when the propeller tracts the aircraft forward. In this position the propeller 906 has an angle off attack or pitch of several degreees relative to its movement through the air in order to apply a tracting effect to the craft. The propeller pitch position 905 of part C of the Figure is the position of smallest resistance during flight in the air. This position is used in motorgliders, when the engine is shut off and the craft exclusively sails without engine support. Propellers of this kind are commercially available and they reduce friction of the craft during flight very considerably. However, according to the invention the resistance can be further reduced, when the propeller will be completely retracted into a respective slot, for example into slot 903 on the tip of the wing 901. Consequently, according to the invention, a slot-chamber 903 is provided at a suitable place of the craft, for example in the front-tip of the wing 901.

The motor, for example fluid motor 902, which carries and drives the propeller 904, is fastened by such a means in or on the respective place, for example on the wing 901, that the fluid motor 902 together with the propeller 904 can be set into two extremes of positions, namely into a forward position for operation of the propeller in flight and into a rectracted or rear position when the propeller rests completely within the slot space, for example in the wing, in order to prevent any resistance of the propeller in flight. The fastening may for example be done by arms 911,912, which swing on holders 909 and 910 which are provided in the aircraft or on the fluid motor 902 respectively. A forward and backward movement device which may for example consist of a piston 913 and a cylinder 914 may be provided between the craft and the motor 902 in order to move the fluid motor 902 with propeller 904 into the forward operation position or into the rear rest position in the slot 903. It may be operated by remote control from the cockpit in any suitable manner, for example by a hydraulic control fluid flow. The motor 902 corresponds to an USA patent application of the inventor and is provided with control means for variation of the propeller-pitch by remote control from the cockpit or by auto matic control depending on the rpm of the propeller 904 and of the rotary parts of motor 902.

The propeller 904 is revolved by the motor 902 only then when the fluid motor 902 and propeller 904 are set into the forward or operating position. For retraction of the fluid motor or motor 902 into the rear position and thereby retracting the propeller 904 into the slot-chamber 903 the motor 902 is stopped before and the propeller 904 is arrested in a position parallel to the slot chamber 903. The propeller 904 is further before it becomes retracted into the slot chamber 903 for rest, pivoted into the pitch 905 parallel to the move or flight of the craft. When these adjustments have been done the propeller 904 can together with the fluid motor 902 be retracted into slot 903 by moving the drive means 913 backwards and thereby swinging the holding arms 911 and 912 backwards. The final location and position of rest in the slot 903 is shown in parts D and E of the Figure. The propeller has now the location 907. Flange 908 holds the propeller 904 in a common way. Instead of holding and moving the motor 902 on arms 911,912, the motor 902 may also be guided in a space as in FIG. 16 or may be held and moved in any other suitable way by suitable holding and moving means.

It is preferred to provide rectractable propellers again in pairs symmetrically to the body of the aircraft.

Referring now again to FIG. 1 with its Figure portions 1-A to 1-F it should be recognized that it is essential that the propeller can be accurately set before it enters at its retraction into the slot or compartment 903. To obtain this accuracy it is important that the propeller driving and holding drive means or motor 902 is accurately kept and moved. Important is also that the chamber, containment space or slot 903 is practically filled when the propeller is retracted and that drag providing hindring slots or unstreamlined configurations are prevented or reduced to the possible minimum. The spaces which are required to swing the drive means, the motor 902, forward and rearward should also be kept to a minimum. Thus, swing space 1903 should be provided to permit the swing of the motor 902 inside of the wing forward and rearward, but its size should be kept to a minimum. The motor should be swang forward and backward by a swing drive means, which might be a piston in a cylinder, 914 forward and rearward. The swing drive means should be pivotably kept by holder 1914 in a respective portion of the wing. As far as it is written that the propeller shall be retractable into the wing 901 that shall define that the propeller may also be applied on a radder, rear portion or on another portion of the aircraft. While the parental application Ser. No. 533,073 which is now U.S. Pat. No. 4,504,029, issued on Mar. 12, 1985, described the principal of the retractable variable pitch propeller of the present invention, the present application describes the preferred solution of the invention in more detail. The Figure portions of FIG. 1 show in details the holding of the swing members, motor, drive means and the different positions of the propeller.

It is preferred that the retraction and expansion of the propeller into and out of the slot 903 be handled by remote control from the cabin of the pilot of the craft. Consequently, a transmission control line or fluid line 1915 may be set from the swing drive means or cylinder 914 to a respective control panel in the aircraft, for example, to the cabin of the pilot. If member 914 is a hydraulic or pneumatic cylinder, the transmission control line 1915 should be a fluid line, as a pipe or hose, and should be connected to a fluid control valve and a fluid flow supply source, which might both be located inside of the body of the aircraft. It would, however, also be possible to locate them inside of the wing and control them by electric or other remote control devices. The invention which is disclosed in FIG. 1 may also be defined as follows:

A fluid borne craft comprising, in combination, a laterally from a body extending airfoiled wing 901 with a drive means 902 to revolve a propeller 904 which is mounted on said wing, wherein said drive means and said propeller are retractable into a portion 903 of said wing and an improvement; wherein said improvement consists, in combination, in:

(a) a slot 903 provided in said wing along the front portion of said wing and longitudinally parallel to said wing;

(b) a configuration of said slot complementary formed relative to the outer measures of the rear portion of said propeller;

(c) said propeller is provided with a means 905 to 908 to change the angle of the pitch of said propeller from an angle 906 of attack relative to the surrounding air to an angle 905 parallel to the chord of said wing with the rear portion of said propeller directed towards said wing at said angle parallel to said chord;

(d) control means 914 to retract and expand said drive means and said propeller into and out of said wing whereby said propeller when retracted into said wing is at least partially received in said slot and said control means expands said propeller out of said slot to be able to revolve in the fluid which surrounds said wing;

(e) a fluid motor 902 provided in said drive means;

(f) a fluid driven piston 913 reciprocable in a cylinder 914 provided in said control means;

(g) holding means 911,912 provided on said fluid motor and on said wing with said holding means pivotable around an axis (axes) 909 of a holder 909 which is provided on said wing;

(h) a portion of said cylinder pivotably provided on a fastening means 914 in said wing and said piston pivotably fastened to said motor 902;

(i) a reception space provided in said wing, and (k) said reception space 1903 of a configuration to receive said fluid motor and to permit the movements of said holding means around said holder and around said fastening means, and;

(l) a remote control device 1915 extended from said control means to the control panel of the driver of said craft.

What is claimed is:

1. A fluid borne craft comprising, in combination, a laterally from a body extending airfoiled wing with a drive means to revolve a propeller which is mounted on said wing, wherein said drive means and said propeller are retractable into a portion of said wing and an improvement; wherein said improvement consists, in combination, in:

(a) a slot provided in said wing along the front portion of said wing and longitudinally parallel to said wing;

(b) a configuration of said slot complementary formed relative to the outer measures of the rear portion of said propeller;

(c) said propeller is provided with a means to change the angle of the pitch of said propeller from an angle of attack relative to the surrounding air to an angle parallel to the chord of said wing with the rear portion of said propeller directed towards said wing at said angle parallel to said chord;

(d) control means to retract and expand said drive means and said propeller into and out of said wing whereby said propeller when retracted into said wing is at least partially received in said slot and said control means expands said propeller out of said slot to be able to revolve in the fluid which surrounds said wing;

(e) a fluid motor provided in said drive means;

(f) a fluid driven piston reciprocable in a cylinder provided in said control means;

(g) holding means provided on said fluid motor and on said wing with said holding means pivotable around an axis of a holder which is provided on said wing;

(h) a portion of said cylinder pivotably provided on a fastening means in said wing and said piston pivotably fastened to said motor;

(i) a reception space provided in said wing, and (k) said reception space of a configuration to receive said fluid motor and to permit the movements of said holding means around said holder and around said fastening means, and;

(l) a remote control device extended from said control means to the control panel of the driver of said craft.

* * * * *